United States Patent
Danaher

(10) Patent No.: US 9,558,211 B1
(45) Date of Patent: *Jan. 31, 2017

(54) INCREMENTAL SCHEMA CONSISTENCY VALIDATION ON GEOGRAPHIC FEATURES

(71) Applicant: Google Inc., Mountain View, CA (US)

(72) Inventor: John Danaher, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,730

(22) Filed: Sep. 14, 2015

Related U.S. Application Data

(63) Continuation of application No. 12/973,164, filed on Dec. 20, 2010, now Pat. No. 9,158,803.

(51) Int. Cl.
*G06F 17/30* (2006.01)

(52) U.S. Cl.
CPC ... *G06F 17/30241* (2013.01); *G06F 17/30292* (2013.01); *G06F 17/30303* (2013.01)

(58) Field of Classification Search
CPC ............ G06F 17/5068; G06F 17/30371; G06F 17/30241
See application file for complete search history.

(56) References Cited

U.S. PATENT DOCUMENTS

| | | | |
|---|---|---|---|
| 5,995,980 A | 11/1999 | Olson et al. | |
| 6,029,173 A * | 2/2000 | Meek | G01C 21/32 707/696 |
| 6,523,047 B1 | 2/2003 | Rafanello et al. | |
| 6,640,223 B1 | 10/2003 | Jones et al. | |
| 6,684,219 B1 | 1/2004 | Shaw et al. | |
| 6,708,112 B1 * | 3/2004 | Beesley | G01C 21/30 340/990 |
| 6,950,828 B2 | 9/2005 | Shaw et al. | |
| 7,389,314 B2 | 6/2008 | Kulkarni et al. | |
| 7,650,331 B1 | 1/2010 | Dean et al. | |

(Continued)

OTHER PUBLICATIONS

WebBase: A Repository of Web Pages, Jun Hirai, Sriram Raghavan, Hector Garcia-Molina and Andreas Paepcke, 1999, 20 pages.

(Continued)

*Primary Examiner* — James Trujillo
*Assistant Examiner* — Fatima Mina
(74) *Attorney, Agent, or Firm* — Lerner, David, Littenberg, Krumholz & Mentlik, LLP

(57) ABSTRACT

Aspects of the invention relate generally to updating interconnected feature data stored in a repository while maintaining highly consistent views of the data. More specifically, aspects relate to updating some features in bulk while providing for incremental updates for others which are not completely independent of the bulk edits. Features which may be updated incrementally may contain references to other features and may be validated on an as-needed basis. These "incremental" features may also be associated with "backreferences," which link two features together and are used in the validation process. For example, where feature A contains a link to feature B and feature B does not also include a link to feature A, if any edits are performed on feature B, a backreference may direct the server to determine whether the references in A are still consistent with the edits to B before the edit goes into a live state.

20 Claims, 9 Drawing Sheets

(56) References Cited

U.S. PATENT DOCUMENTS

| | | | |
|---|---|---|---|
| 7,702,649 B1* | 4/2010 | Bresch | G06F 17/30917 707/999.104 |
| 2003/0204481 A1 | 10/2003 | Lau | |
| 2005/0228784 A1 | 10/2005 | McCauley et al. | |
| 2006/0031433 A1 | 2/2006 | Patrick et al. | |
| 2006/0136123 A1* | 6/2006 | Chinitz | G01C 21/3476 701/410 |
| 2007/0093997 A1* | 4/2007 | Yang | G06F 17/5009 703/8 |
| 2007/0106455 A1 | 5/2007 | Fuchs | |
| 2007/0198172 A1* | 8/2007 | Sumizawa | G08G 1/0969 701/533 |
| 2008/0163073 A1* | 7/2008 | Becker | G06Q 30/00 715/753 |
| 2009/0228528 A1 | 9/2009 | Ercegovac et al. | |
| 2009/0319550 A1 | 12/2009 | Shau et al. | |
| 2011/0010344 A1* | 1/2011 | Sjogren | G06F 17/30575 707/638 |
| 2011/0072020 A1* | 3/2011 | Ngo | G01C 21/20 707/739 |

OTHER PUBLICATIONS

The Chubby Lock Service for Loosely-Coupled Distributed Systems, Mike Burrows, Nov. 2006, 16 pages.

"Distributed Lock Manager" [online] [Retrieved Jul. 21, 2010] Retrieved from the internet: <http://en.wikipedia.org/wiki/distributed_lock_manager>, 4 pages.

Jeffrey Dean and Sanjay Ghemawat, MapReduce: Simplified Data Processing on Large Clusters, Dec. 2004, 13 pages.

* cited by examiner

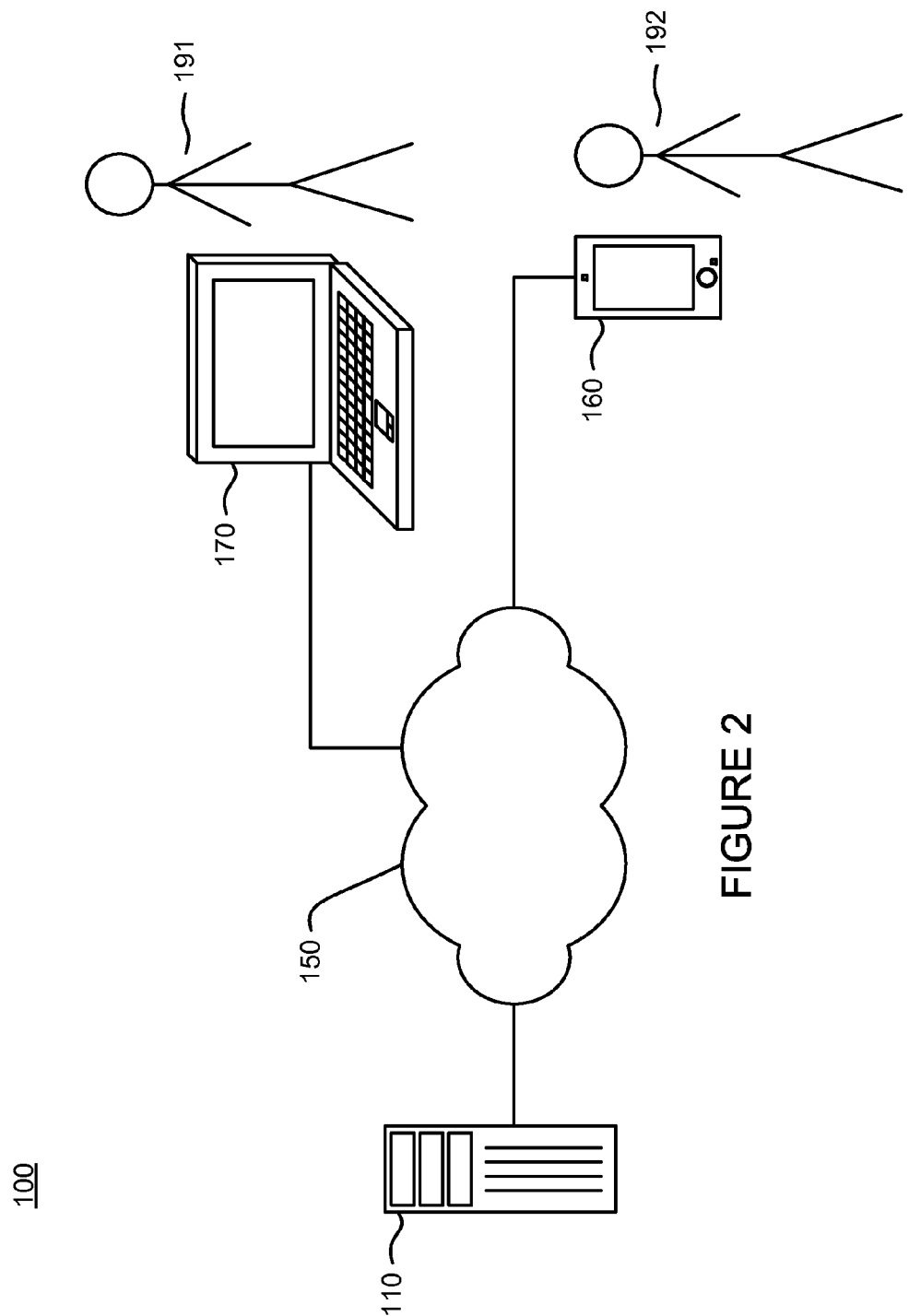

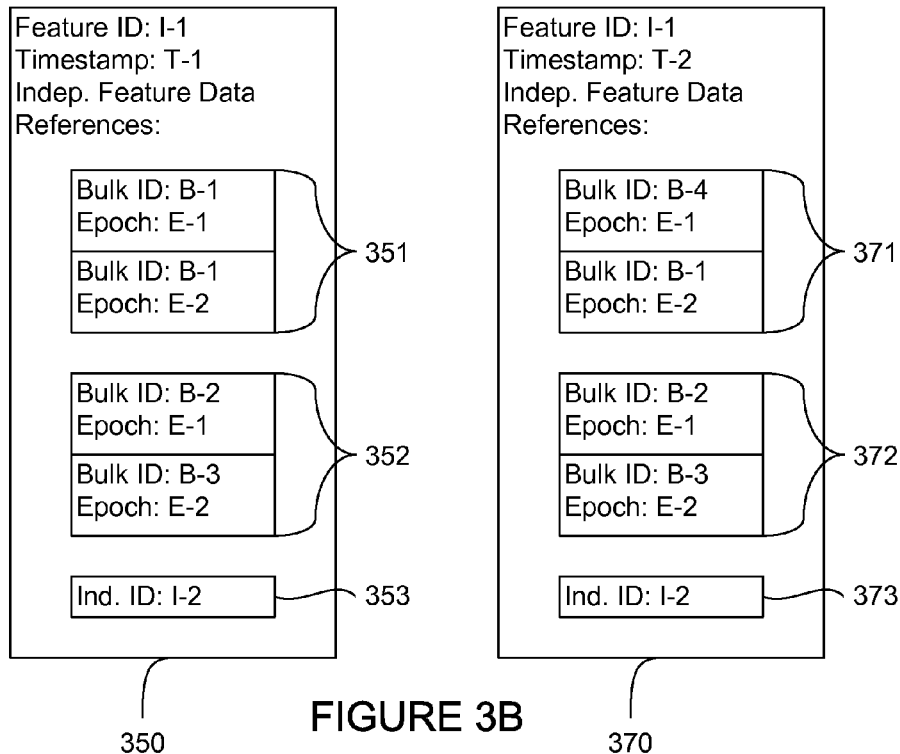
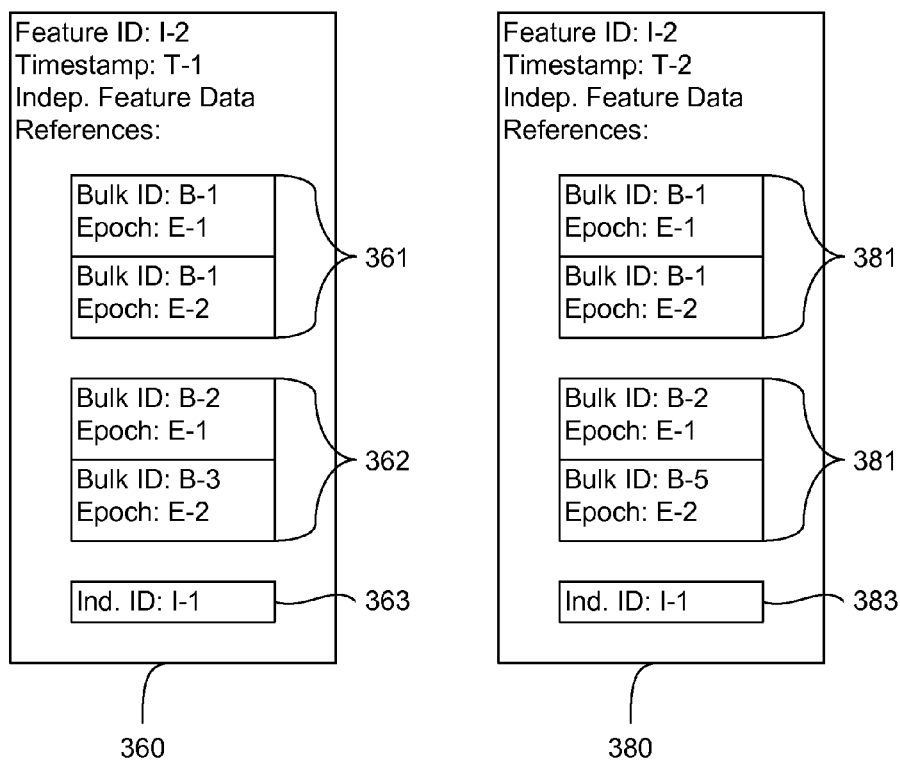
FIGURE 3B

| Feature ID: 430 |
| --- |
| Type: Establishment |
| Bound: (10.5,10.5)-(10.5,10.5) |
| Point: (10.5,10.5) |
| Address: Feature 413 |
| Name: "Joe's Pizza" |

| Feature ID: 421 |
| --- |
| Type: Intersection |
| Bound: (11,10)-(11,10) |
| Point: (11,10) |
| Segments: Feature 412, Feature 411, Feature 413 |

| Feature ID: 413 |
| --- |
| Type: Road segment |
| Bound: (10,10)-(10,11) |
| Start_point: (10,10) |
| End_point: (11,10) |
| Polyline: (10,10), , (11,10) |
| Route: Feature 440 |
| Route_type: Route |
| Start_intersection: Feature 420 |
| End_intersection: Feature 421 |

| Feature ID: 440 |
| --- |
| Type: Route |
| Bound: (5,9)-(15,11) |
| Children: Feature 413, Feature 412, Feature 411 |
| Child_type: Road segment |
| Name: 14th Street |

FIGURE 4D

| Feature ID: 501 | Feature ID: 502 | Feature ID: 503 |
|---|---|---|
| Type: Establishment | Type: Establishment | Type: Establishment |
| Name: "Dr. Smith" | Name: "NY Medical Practice" | Name: "NY Medical Building" |
| Bound: (20,20)-(20,20) | Bound: (20,20)-(20,20) | Bound: (20,20)-(20,20) |
| Works-at: Feature 502 | Occupies: Feature 503 | Occupant: Feature 502 |

FIGURE 5

INCREMENTAL SCHEMA CONSISTENCY VALIDATION ON GEOGRAPHIC FEATURES

CROSS-REFERENCE TO RELATED APPLICATIONS

The present application is a continuation of U.S. patent application Ser. No. 12/973,164, filed Dec. 20, 2010, the disclosure of which is incorporated herein by reference.

BACKGROUND OF THE INVENTION

Systems which provide geographic information services to users typically require constant updating in order to maintain usefulness and accuracy. Geographic systems may continuously update the features which are used to describe or generate a particular view of the world (map or map information), for example, information regarding the course and location of roadways, business information, size and location of buildings and other structures, etc. In addition, these features may be associated with any number of "references" which associate or link two or more features together. In other words, a reference may describe an instance of a relation between the two features.

For example, a town (feature T) may be contained within a state (feature S). The relation is between S and T ("is contained within"), and the reference is therefore an instance of two features (S and T) involved in the relation. Thus, changes or updates to feature S may have an effect on feature T. In another example, updating road data on one or two segments of a road network will undoubtedly affect the attributes of the surrounding segments. For this reason, road data may be considered highly "dependent" and thus may have a large number of references. Accordingly, maintaining consistent views of the world (maps and map information) not only involves updating the features themselves but also maintaining the consistencies of any references.

Presently, updating large geographic information systems may involve either completely locking users out during an updating period or performing an update or entering changes at a time when users are less likely to request information. These systems may operate under the assumption that all of the data is highly dependent (there are many references) and must be delivered in bulk. As a result, the entire world of data may need to be re-written periodically, such as every week, in order to maintain consistency. However, not all edits may affect the consistency of the data. For example, edits to a telephone number or the operating hours of a business may be completely independent of any other features, and thus may be allowed independent of other changes in the system. Accordingly, bulk updating all of the information periodically may delay data updates and requires enormous processing power.

Even using the total bulk updating model, it may be difficult to merge highly dependent data from multiple sources. Some systems may partition the world based on the feature type and country. Highly dependent types, such as roads, may only be taken from a single source per country which may present problems when managing cross-country references in these data sources, for example, when attempting to connect road networks across borders.

In addition to editing data, these services must also validate the data. Generally, these services must check each edited attribute, one by one, to ensure that the data is consistent. For example, where feature A includes references to features B and C, the server may retrieve both features B and C in order to ensure that the changes to feature A do not invalidate some parameter associated with features B or C. Calling each of the referenced features is a slow process and introduces the risk of collisions between updating a feature and calling the same feature to validate an edit to another feature. Thus, this method may result in a significant investment in processing power and time required to complete the validation.

BRIEF SUMMARY OF THE INVENTION

Aspects of the invention relate generally to updating interconnected features stored in a repository while maintaining highly consistent views of the repository data. More specifically, aspects relate to updating some features in bulk while providing for incremental updates for other features which are not completely independent of the bulk edits. Features which may be updated incrementally may contain references to other features. These features may be validated on an as-needed basis in order to reduce the processing power and time required to validate the changes. In some examples, these "incremental" features may be associated with "backreferences," which link two features together in order to simplify and expedite the validation process. In other words, where feature A contains a link to feature B and feature B does not also include a link to feature A, if any edits are performed on feature B, a backreference may direct the server to determine whether the references in A are still consistent with the edits to B before the edit goes into a live state. This may allow the system to maintain consistent views of the data while also reducing the amount of processing required to validate the incremental edits.

One aspect of the invention provides a computer-implemented method for validating edits to features stored in a partition of a repository which allows for incremental edits to the features. The method includes storing a plurality of features in the partition of the repository, a subset of the plurality of features is associated with a reference identifying a referenced feature of the plurality of features; editing, by a processor, a first feature of the plurality of features by making one or more edits to obtain an edited first feature; identifying a reference associated with the edited first feature, the reference identifying a second feature of the plurality of features; determining, by the processor, a relationship type associated with a set of requirements based on the edited first feature and the reference; if the one or more edits affect the relationship with the second feature based on the relationship type, retrieving the referenced feature; and if the edited first feature and the referenced feature satisfy the set of requirements, validating the edited feature.

In one example, the method also includes rejecting the edited feature if the one or more edits do not satisfy the set of requirements. In another example, the method also includes identifying a set of code based on the relationship type; and determining whether the one or more edits could affect the second feature based on the set of code. In another example, the method also includes determining if the edited first feature and the referenced feature satisfy the set of requirements based on the set of code. In another example, the relationship type is a bidirectional relationship type between the edited first feature and the referenced feature. In another example, the second feature includes a reference to the first feature. In another example, the referenced feature is retrieved from the repository. In another example, the one or more edits to the first feature are included in an editing transaction and the referenced feature is an edited feature included in the editing transaction.

Another aspect of the invention provides a computer-implemented method for acting on backreferences to features stored in a partition of a repository which allows for incremental edits to the features. The method includes storing a plurality of features in the partition of the repository, a subset of the plurality of features is associated with a reference identifying a referenced feature of the plurality of features; editing, by a processor, a first feature of the plurality of features by making one or more edits to obtain an edited feature; identifying a unidirectional reference associated with the edited feature, the unidirectional reference identifying a second feature of the plurality of features; determining a unidirectional relationship type based on the edited feature and the reference; identifying a backreference action to be taken based on the unidirectional relationship type and the one or more edits, wherein the backrereference action is selected from the group consisting of adding, dropping, and keeping; and performing, by the processor, the backreference action.

A further aspect of the invention provides a computer-implemented method for validating edits to features stored in a partition of a repository which allows for incremental edits to the features. The method includes storing a plurality of features in the partition of the repository, each feature of the plurality of features is associated with a feature identifier, a subset of the plurality of features is associated with a reference identifying a referenced feature of the plurality of features; editing, by a processor, a first feature of the plurality of features by making one or more edits to obtain an edited feature associated with a feature ID which is the same as the feature ID of the first feature; accessing a table listing a plurality of backreferences, each backreference is associated with the feature identifier associated with a referred to feature, a feature identifier associated with a referring feature, and a backreference type associated with a set of requirements; identifying one of the plurality of backreferences associated with a referred to feature ID which is the same as the feature ID of the first feature; if the one or more edits could affect the referring feature associated based on the backrereference type, retrieving the referring feature from the repository; and if the edited feature and the referring feature satisfy the set of requirements, validating, by the processor, the edited feature.

Yet another aspect of the invention provides computer for validating edits. The computer includes memory including a repository with a partition and a processor coupled to the memory. The processor is operable to store a plurality of features in the partition of the repository, a subset of the plurality of features is associated with a reference identifying a referenced feature of the plurality of features; edit a first feature of the plurality of features by making one or more edits to obtain an edited first feature; identify a reference associated with the edited first feature, the reference identifying a second feature of the plurality of features; determine a relationship type associated with a set of requirements based on the edited first feature and the reference; if the one or more edits affect the relationship with the second feature based on the relationship type, retrieve the referenced feature from the memory; and if the edited first feature and the referenced feature satisfy the set of requirements, validate the edited feature.

In one example, the processor is also operable to reject the edited feature if the one or more edits do not satisfy the set of requirements. In another example, the processor is also operable to identify a set of code based on the relationship type and determine whether the one or more edits could affect the second feature based on the set of code. In another example, the processor is also operable to determine if the edited first feature and the referenced feature satisfy the set of requirements based on the set of code. In another example, the relationship type is a bidirectional relationship type between the edited first feature and the referenced feature. In another example, the second feature includes a reference to the first feature. In another example, the referenced feature is retrieved from the repository. In another example, the one or more edits to the first feature are included in an editing transaction and the referenced feature is an edited feature included in the editing transaction.

Still a further aspect of the invention provides a computer for validating edits. The computer includes memory including a repository with a partition. The computer also includes a processor coupled to the memory. The processor is operable to: store a plurality of features in the partition of the repository, a subset of the plurality of features is associated with a reference identifying a referenced feature of the plurality of features; edit a first feature of the plurality of features by making one or more edits to obtain an edited feature; identify a unidirectional reference associated with the edited feature, the unidirectional reference identifying a second feature of the plurality of features; determine a unidirectional relationship type based on the edited feature and the reference; identify a backreference action to be taken based on the unidirectional relationship type and the one or more edits, wherein the backrereference action is selected from the group consisting of adding, dropping, and keeping; and perform the backreference action.

Yet a further aspect of the invention provides a computer for validating edits. The computer includes memory including a repository with a partition for storing a plurality of features in the partition of the repository. Each feature of the plurality of features is associated with a feature identifier. A subset of the plurality of features is also associated with a reference identifying a referenced feature of the plurality of features. The memory also stores a table listing a plurality of backreferences. Each backreference is associated with the feature identifier associated with a referred to feature, a feature identifier associated with a referring feature, and a backreference type associated with a set of requirements. The computer also includes a processor coupled to the memory. The processor is operable to: edit a first feature of the plurality of features by making one or more edits to obtain an edited feature associated with a feature ID which is the same as the feature ID of the first feature; access the table listing the plurality of backreferences; identify one of the plurality of backreferences associated with a referred to feature ID which is the same as the feature ID of the first feature; if the one or more edits could affect the referring feature associated based on the backrereference type, retrieve the referring feature from the repository; and if the edited feature and the referring feature satisfy the set of requirements, validate the edited feature.

BRIEF DESCRIPTION OF THE DRAWINGS

FIG. 2 is a pictorial diagram of a system in accordance with an aspect of the invention.

FIGS. 3A and 3B are diagrams of exemplary data in accordance with aspects of the invention.

FIGS. 4A-4D are diagrams of exemplary data in accordance with aspects of the invention.

FIG. 5 is a diagram of exemplary data in accordance with aspects of the invention.

DETAILED DESCRIPTION

Figure 1:
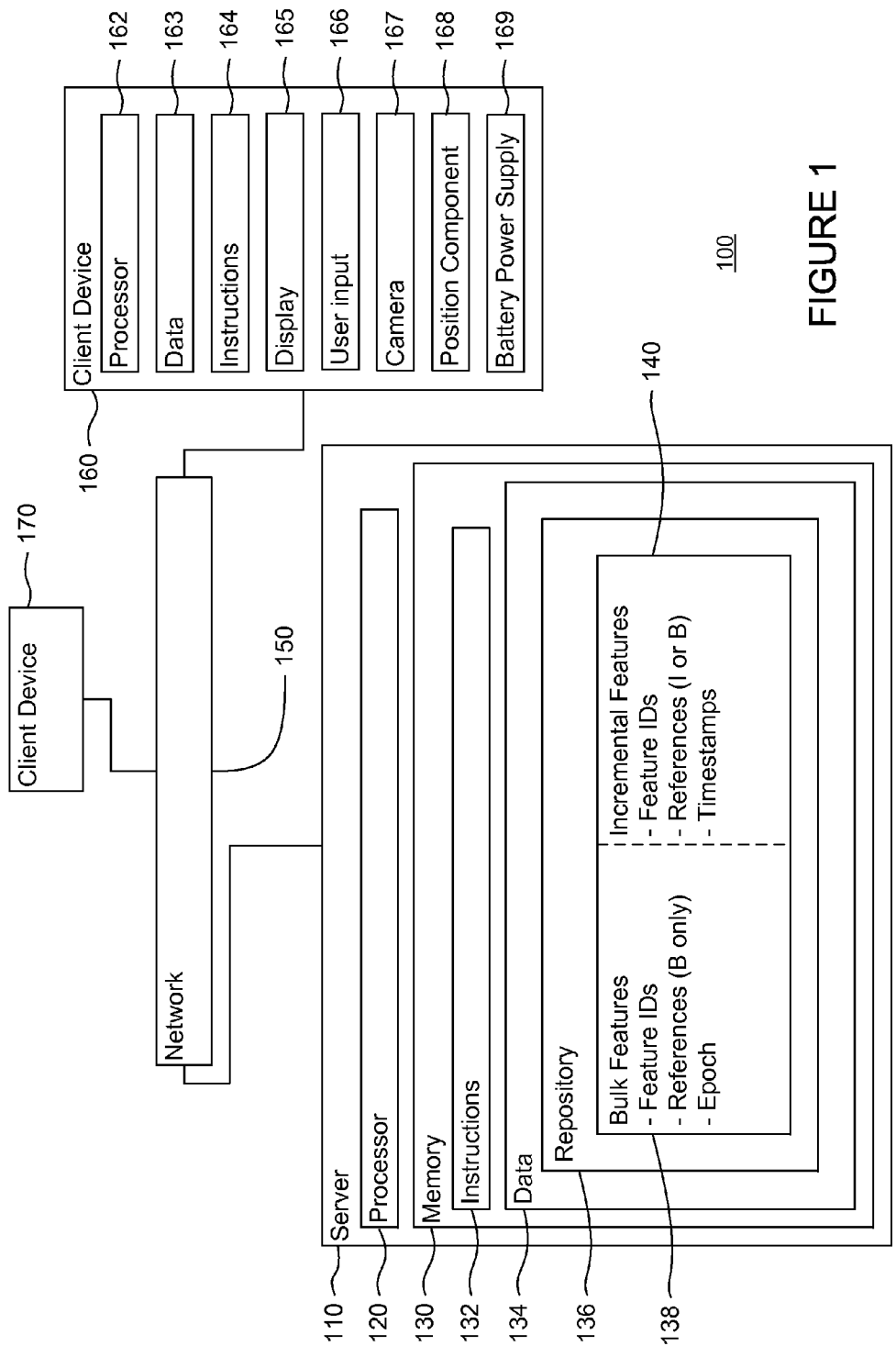
FIG. 1 is a functional diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations or servers) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, position component 168, accelerometer, speakers, a network interface device, a battery power supply 169 or other power source, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

Repository 136 may store feature-related data as part of memory 130. Although shown as a single block within server 110, it will be understood that repository 136 may actually refer to storage associated with a single server or multiple servers. As described above, the repository may include feature data which describes a world, for example maps and associated map information, which may be queried and returned to a client device for display to a user. The repository may be partitioned into two or more partitions such that data may be stored in each of the partitions.

For example, one partition may be used to store bulk features 138. Bulk features may include features which are updated in bulk, for example, highly dependent features such as road segments, etc. It will be understood, however, that road segments and other highly dependent features need not be designated as bulk features and may actually be designated as incremental features which may be updated incrementally as described in more detail below. Thus, at least some portion of or all of the road segments in a repository of geographic information may be designated as incremental features or bulk features. Accordingly, some highly dependent features, such as road segments, may be used herein as examples of incremental features or bulk features.

Each bulk feature may be associated with a feature identifier (feature ID), references, and an epoch. A feature ID may be used to identify the bulk feature as well as other features of the repository. Thus, a particular reference of a bulk feature may actually include the feature ID of the referenced feature. Bulk features may only include references to other bulk features. In addition, the references need not include the epoch of the referenced feature as bulk features may only include references to other bulk features of the same epoch.

Figure 3A:
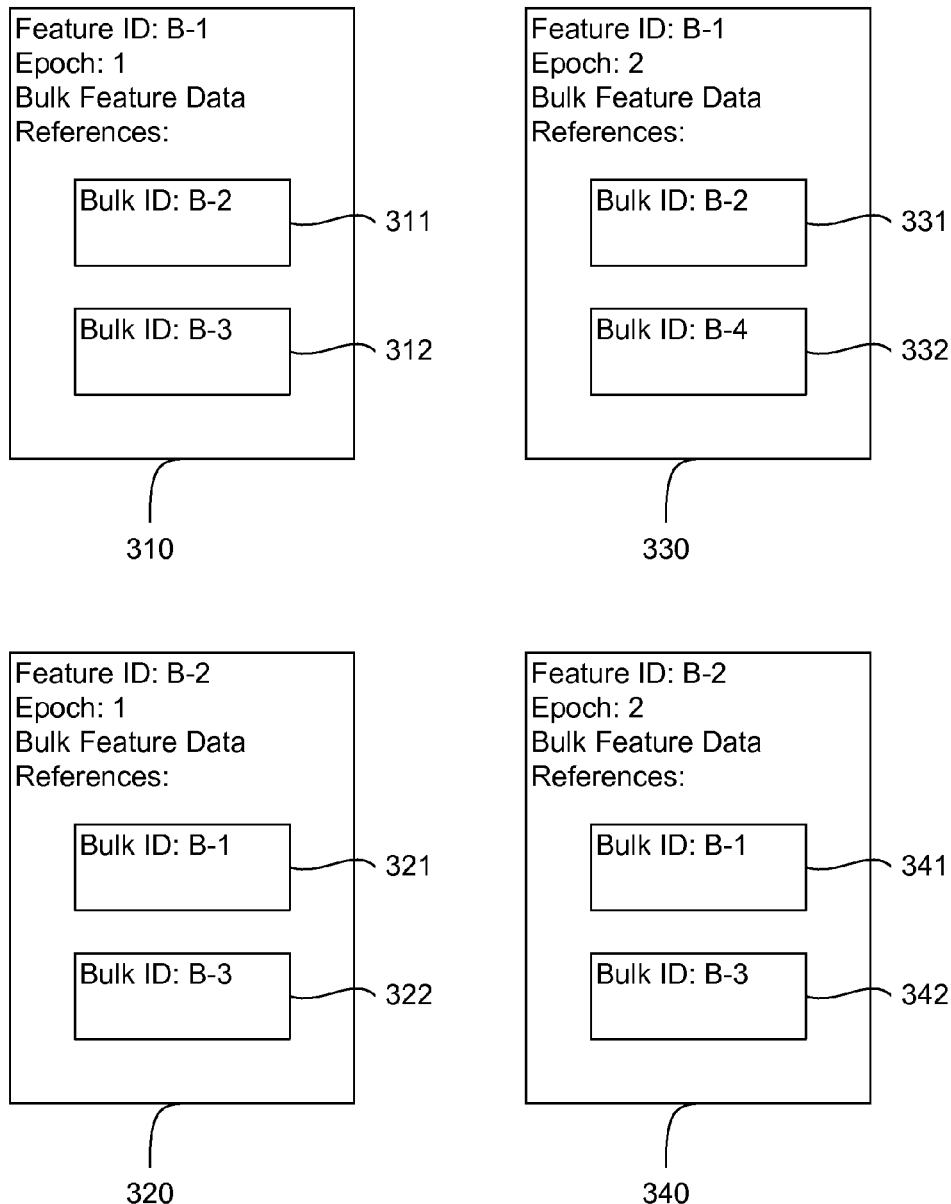

FIG. 3A includes exemplary bulk features from two different epochs. For example, each of bulk features of 310, 320, 330, and 340 includes bulk feature information. Bulk features 310 and 320 are identified by feature IDs B-1 and B-2, respectively. Both bulk features 310 and 320 are also associated with epoch 1 and only include references (311-312 and 321-322) to other bulk features but do not identify a particular epoch.

Bulk features 330 and 340 represent bulk features 310 and 320 at epoch 2. These bulk features at epoch 2 again only include references (331-332 and 341-342) to other bulk features but do not identify a particular epoch. Between epoch 1 and epoch 2, feature B-1 is changed such that reference 312 to feature B-3 is updated to feature B-4 at reference 332. Between epoch 1 and epoch 2, feature B-2 is changed such that the bulk feature data is updated.

The bulk features 138 may (but need not) be organized as a table which holds all bulk epoch information and the current state of each epoch. Again, the epoch may be described as a series of replacements edits to the bulk features 138. A particular epoch's edits to a particular bulk feature and the particular bulk feature itself may be considered different versions of the same feature. In other words, the feature at two different epochs may be considered two different versions. Thus, each version of a bulk feature may be uniquely identified by its feature ID (the same for each version of a bulk feature) and an epoch ID (different for each version of a bulk feature). The bulk epoch table may include a column or series of entries identifying the state of the bulk epoch as in, for example, an in-progress state (being written), a committed state (ready to go live), a blessed state (live), and an abandoned state (not to be used).

While there may be many different epochs in various states, only one epoch may be in the "in-progress" state at any given time. When writing a particular bulk feature associated with a particular feature ID, there may not be any previous incremental feature versions (see further description below) associated with the same feature ID. If a client device queries any of the edited features, the server will not return any of changes to the features associated with an "in progress" epoch.

Once the edits have been completed, the status of the epoch may be updated to an "approval" or other similar state which allows for internal validation checks of the bulk edits, for example, for quality, consistency, and accuracy. The validation checks may include using Google's MapReduce product as described in the article by Jeffrey Dean and Sanjay Ghemawat, entitled "MapReduce: Simplified Data Processing on Large Clusters," OSDI'04: *Sixth Symposium on Operating System Design and Implementation*, San Francisco, Calif., (2004), and U.S. Pat. No. 7,650,331 to Dean, et al., the disclosures of which are hereby incorporated herein by reference. MapReduce may be run over a portion of or the entire epoch to ensure that various benchmarks have been met. MapReduce may be done before or after the epoch is written to the repository, while other checks (such as validating that there is no other incremental feature at a bulk feature's feature ID) may be performed as the edits are being written. For example, the validation checks may include checking bulk feature edits to ensure that there is no previous incremental feature associated with any other bulk feature's feature ID, that the bulk features only include references to other bulk features (without epoch designation), that there are no references to incremental features, etc. The validation checks may also include checking incremental features to ensure that any references include bulk features with epochs and incremental features without epochs, etc.

Where the edits have been completed, and in some examples validated, the bulk epoch may be moved to a "live" or other similar state. Once an epoch is moved to the live state, the bulk features may be accessed by client devices and may not be "abandoned". At any point in time before going live, a bulk epoch may be set to the abandoned state where all of the changes of the bulk epoch are ignored or are no longer visible to any client device. Though it is not necessary, in some examples, in order for a bulk epoch to go live, all previous bulk epochs must also be live or abandoned.

As shown in FIG. 1, another partition of repository 136 may be used to store incremental features 140. Incremental features 140 may be updated incrementally (as opposed to in bulk) and independently of other features. For example, a business listing including a phone number may be designated as an incremental feature because updating a phone number should have little to no effect on the rest of the repository data. However, as explained above, incremental features may also include other features, such as road segments, which are dependent upon other features and to which changes may affect some portion of the repository data. Incremental features may be updated in place and in near real time, such as, for example, on the order of minutes.

Similar to bulk features, incremental features may be associated with feature IDs which may be used to identify and retrieve these features.

Incremental features 140 may also include references to other features. For example, a particular incremental feature may include references to other bulk features and/or other incremental features. Each reference to another incremental feature may include the feature ID of the other incremental feature. Each reference to a bulk feature may include a bulk feature ID and an epoch. The particular incremental feature may also include references to the same bulk feature at different epochs.

Each time an incremental feature is edited or updated, the updated feature is associated with a new timestamp. For example, a user may request or call the incremental feature in order to make any edits. A transactional storage system, such as a database, may be used to resolve any conflicts if multiple edits are attempted on the same feature. The transactional system may effectively serialize the calls to ensure that each transaction, for example edit, leaves the edited feature as well as the repository in a consistent state.

Accordingly, there may be a plurality of different versions of the same incremental feature (with the same feature ID) at different timestamps.

Once each of the bulk epoch features have been written and/or edited (for example in a new epoch), the incremental features must also be updated. For example, if bulk epoch X has been completed, any incremental features with references to bulk features must be updated, such as by generating a new timestamp to include any updated references to the appropriate feature at bulk epoch X.

FIG. 3B includes exemplary incremental features from two different timestamps. For example, each of incremental features 350, 360, 370, and 380 includes incremental feature information. Incremental features 350 and 360 are identified by feature IDs I-1 and I-2, respectively. Both incremental features 350 and 360 are also associated with timestamp T-1. These incremental features also include references 351-352 and 361-362 to bulk features and references 353 and 363 to incremental features.

In the example of FIG. 3, each of the references to bulk features includes a version of the reference for each bulk epoch, assuming in the example, there are only epochs 1 and 2. Incremental features 370 and 380 represent incremental features 350 and 360 associated with timestamp T-2. These incremental features also include references 371-372 and 381-382 to bulk features and references 373 and 383 to incremental features. Again, each of the references to bulk features includes a version of the reference for each bulk epoch, again, assuming in the example that there are only epochs 1 and 2. Between timestamps T-1 and T-2, incremental feature I-1 us updated by changing the feature ID at epoch 1 of reference 351 to the feature ID at epoch 2 of reference 371. Between timestamps T-1 and T-2, incremental feature I-2 us updated by changing the feature ID of reference 363 to the feature ID of reference 383.

Similar to bulk features 138, incremental features 140 may also be organized as a table which includes all of the feature's information. For example, the table may include the incremental feature's feature ID, the feature data, a timestamp, and any associated references.

Again, the repository 136 may be partitioned such that bulk features 138 may only include references to other bulk features (no incremental features), whereas incremental features 140 may include references to bulk features or incremental features. As bulk features cannot contain references to incremental features, any bidirectional references must tie two bulk or two incremental features together. For example, A and B may be, for example, a route and a road segment, respectively. These features may contain bidirectional references, where A includes a reference to B and B includes a reference to A. If B is a bulk feature, A must be a bulk feature, and if A is an incremental feature, B must also be an incremental feature. The reverse must also be true. Thus, the feature pairs with bidirectional references must be either both bulk or both incremental features.

Some features may also include unidirectional references. For example, a feature such as a business may refer to a road segment in the business's address. In some examples, the road segment may not include a reference to the business. The relationship between the business and the road segment is thus a unidirectional one.

Where an incremental feature includes a unidirectional reference to another incremental feature, the server may store a "backreference" or "reverse reference." For example, if feature A refers to feature B, the server may generate a backreference from feature B to feature A. As explained in more detail below, these backreferences may be required in order to insure that changes to the referred to feature are still consistent with the referring feature. A backreference may only originate from another incremental feature. The server may store a list of such backreferences, for example, in a table indexed by the incremental feature's feature ID values.

Each backreference may also have one or more unidirectional relationship types associated and stored with it. These backreference types may identify attributes of the referred to feature changes to which may affect the backreference or the referred to feature. For example, if an establishment refers to a road segment in its address, the relationship might be affected if the road moves (since there might be a requirement that an establishment be near the road that it is on) but it might not be if the road changes from a two-way to a one way. Thus, the backreference may be identified as an "address," "geometry," "bounds," or "establishment-road segment" type relationship. This is because changes to the referred to the geometry or bounds of the road segment may affect an establishment's address or relationship with the road segment.

Backreferences to bulk features need not, but may, exist. As bulk features may only be written in the "in-progress" state and as references to bulk features may only reference to epochs which have gone live, a bulk feature may never change out from under a reference to it. For example, bulk feature A may be written once at bulk epoch 1 and then never modified. It may be edited in a future epoch, but the old value at bulk epoch 1 may remain. Thus, a feature A at bulk epoch 1 may be immutable once written. Therefore, any references to feature A at bulk epoch 1 cannot become invalid. Therefore it may be unnecessary to store a list of backreferences to bulk features.

Various operations in accordance with aspects of the invention will now be described. It should also be understood that the following operations do not have to be performed in the precise order described below. Rather, various steps can be handled in a different order or simultaneously.

Once an incremental feature has been edited, for example, a new version at a new time stamp has been generated, the server may perform various validation checks to ensure the validity of the changes. These validation checks may include, for example, checking single-feature validity, referenced-feature existence, as well as multi-feature consistency.

Single feature validity may include validating data within a single feature, such as by checking that expected fields are present. For example, a route feature may be required to contain route data but no address or polygon data; a transit-transfer feature must contain transit-transfer data of a non-negative distance; and a name feature representing a province code must not contain a language code.

The server may also validate by checking for a referenced feature's existence. For example, one feature may refer to another by its feature ID. For all such references, the repository must include a feature with the referred to feature ID. Thus, the server may check the repository for the existence of the referred to feature ID.

The server may also check for consistency between two incremental features which refer to one another. For example references between features may induce consistency requirements between the referring feature and the referred to feature. In one example, a required bidirectional relationship may be required where a road segment refers to an intersection as its endpoint. In other words, the intersection must also refer to the road segment. In another example, many references may require that the referred to feature's bound (for example, geolocation coordinates which define the geographic limits of a feature) contain the referring feature's bound. For example, a city's bound may be required to be within a state's bounds.

In some examples, some reference may induce a collective or "group" consistency requirement between a common "hub" feature and a set of features. For example, all of an intersection's incoming road segments may be required to be ordered counterclockwise according to the geometry of the road segments. If the intersection does not store the angle of the intersection at which each of the road segments intersect the intersection, the server retrieving each of the road segment features may calculate the angles based on the last two points along the road segment before it intersects with the intersection. The server may then determine whether the set of road segments is listed in the correct order. Thus, if an edit were to add a new road segment to an intersection, the server may retrieve the two road segments intersecting with the intersection on either side of the new road segment. If an edit changes the angle at which a segment approaches an intersection, the server may retrieve the intersection feature, run a group check around the edited segment, and retrieve the two road segments intersecting with the intersection on either side of the edited road segment. Once each of these features has been returned, the server may run the group validation on the intersection and the three road segments.

In another example, the server may perform group validation checks on transit routes. Transit networks, such as subways, trains and busses, may be treated similarly to road segments. These features may include routes (bus routes, train routes, subway routes) which may be divided into legs. The server may require that each leg in the middle of a route have an end point which is the starting point of the next leg of the route. For example, a route feature from point A to point D may include references to leg feature A-B, leg feature B-C, and feature leg C-D, where leg feature A-B includes start point A and end point B, leg feature B-C includes start point B and end point C, and leg feature C-D includes start point C and end point D. If the route is edited such that leg feature B-C becomes leg feature B-X, the server may be required to retrieve the route, identify the leg features on either side of the edited leg feature, and determine whether these features include an end point of B and a start point of X.

Incremental Features with Bidirectional Relationships

In one example, the server may perform validation checks on an incremental feature which includes a bidirectional relationship with another feature. For example, if a first incremental feature is a road segment, it may include a reference to second incremental feature such as an intersection. If the intersection feature also includes a reference to the road segment, these features may share a bidirectional relationship. Thus, the server may first examine a feature to determine if it includes any reference to other features.

The server may identify a type of the bidirectional relationship between a first incremental feature and a second incremental feature. For example, where one feature of a certain type, such as a road segment, references another feature of a certain type, such as an intersection, the server may identify the relationship as a "road segment-intersection" relationship. It will be understood that the server need not call the second reference from the repository to determine that the relationship is bidirectional. The bidirectionality of a relationship may be apparent from the relationship's type. In other words, the types of first and second features may require the relationship to be bidirectional. It will be further understood that the relationship types used herein are merely exemplary and not limiting as many different variations of relationships may be used.

Next, the server may determine whether the first incremental feature has changed in a way that could invalidate its relationship with the second incremental feature. For example, once the relationship has been classified, the server may identify an appropriate set of code, such as a C++ object, for examining the features of the identified relationship types. Similarly, if a feature includes multiple bidirectional relationship types with other features, the server may identify one or more appropriate sets of code or C++ objects based on the identified relationship types.

The server then runs the appropriate set of code upon the first incremental feature to determine whether the edits to the feature require the server to validate the relationship between the first incremental feature and the second incremental feature. In other words, rather than requesting the second feature, the server may determine whether this type of edit would affect this type of feature relationship. For example, a road segment's position changing might invalidate its relationship with an intersection, as might the addition or removal of an intersection change the relationship with a road segment.

If the relationship may be affected by the edit, the server may request the second incremental feature from the repository in order to perform the validation checks. Using the example of features A, B, and C above where A includes reference to B and C, the server may identify the relationship types of the A to B and A to C references and determine whether the edits could affect these relationship types.

Once both of the incremental features in a pair are available, each relationship may be validated. For example it may take some time for queries to the persistent storage to return a requested feature, and different queries may take different lengths of time. When both features of a pair are returned, the server examines the pairs of features as they come available and runs the appropriate validation checks. For example, the pair of features may be passed back through the appropriate set of code for the relationship type (previously selected based on the type of relationship between the features). The server may record warnings or errors if the server finds any invalid relationships depending on the severity of the problem. For example, small errors such as an unexpected character (e.g. "~" or "^") in a feature's title or name or a road segment in one country referring to an intersection in another country, may be identified as a warning, but this may not be sufficient to reject the edit. Similarly, if a referenced feature does not exist or a city is outside of it's state's bounds, errors may be generated and the respective edits may be rejected. Any errors may ultimately cause the entire edit to be rejected in order to maintain the consistency of the data stored in the repository.

In some examples, the server may also determine whether an edit or editing transaction actually includes edits to a plurality of features. In this case, the server may first determine whether the editing transaction which includes the edit to a first feature also includes an edit to a second feature which may be affected by the edit to the first feature. If so, the server may retrieve the edited version of the second feature for all of the consistency checks rather than using the pre-edited version from the repository.

Rejected edits may not be applied to the repository, but the details of the error may be returned to the client device that originally submitted the edit. In some examples, the error may be logged and manually reviewed in order to correct the error.

In some examples, the actions described above may be performed as a single step. For example, for a particular feature and relationship type, all of the reference of that type may be collected from a feature and tagged with whatever data in the feature is relevant to the reference. This data may be collected before and after the edit. Then, the server may compare the sets of references and the tagged data for each reference to determine whether a particular reference is to be checked.

FIGS. 4A-4D depict an exemplary road network and will be used to illustrate various examples of the process described above. It will be understood that for the purposes of this example, all of the features described, namely 410-14, 420-21, 430, and 440, are incremental features stored in the incremental feature partition of the repository.

Figure 4A:
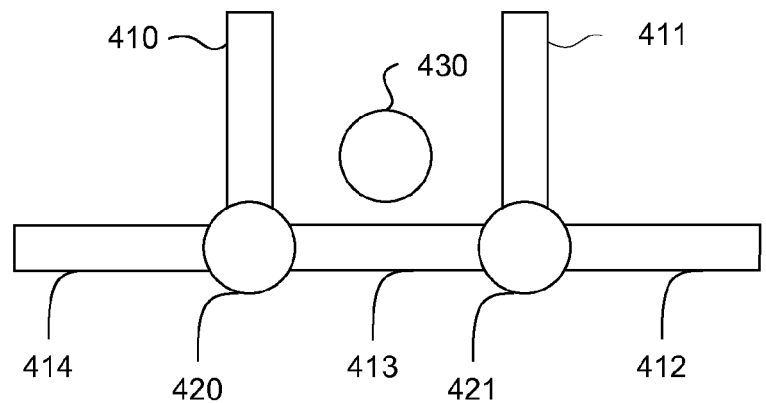
Figure 4B:
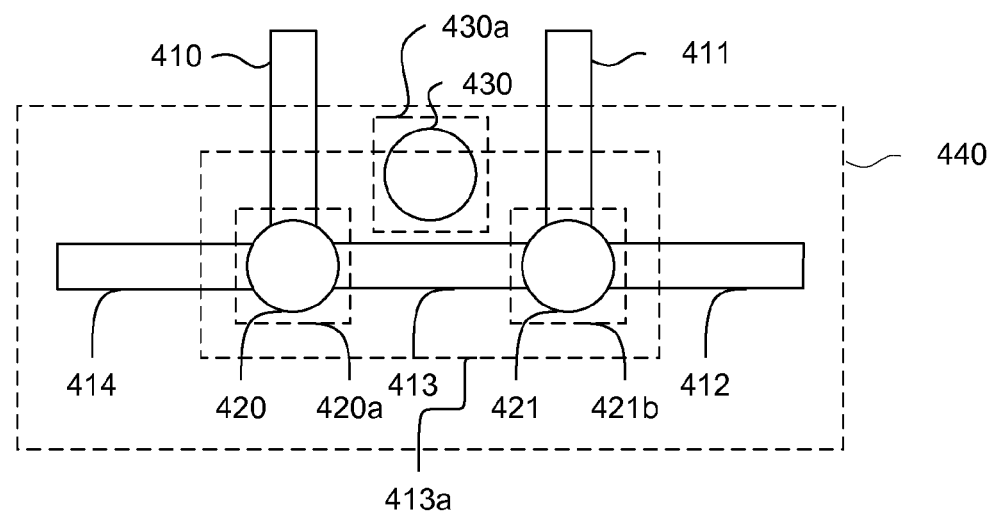

FIG. 4A depicts the "physical" relationships among five road segment features 410-14, two intersection features 420-21, and an establishment or business feature 430 of a road network. FIG. 4B also depicts the boundaries of various features. For example, boundary 430*a* depicts a bounding box or the geographic boundaries of establishment feature 430, boundary 413*a* depicts the boundary of feature 413, and boundaries 420*a* and 421*a* depict the boundaries of intersection features 420-21, respectively. Box 440 depicts the route feature which encompasses road segment features 412-14.

Figure 4C:
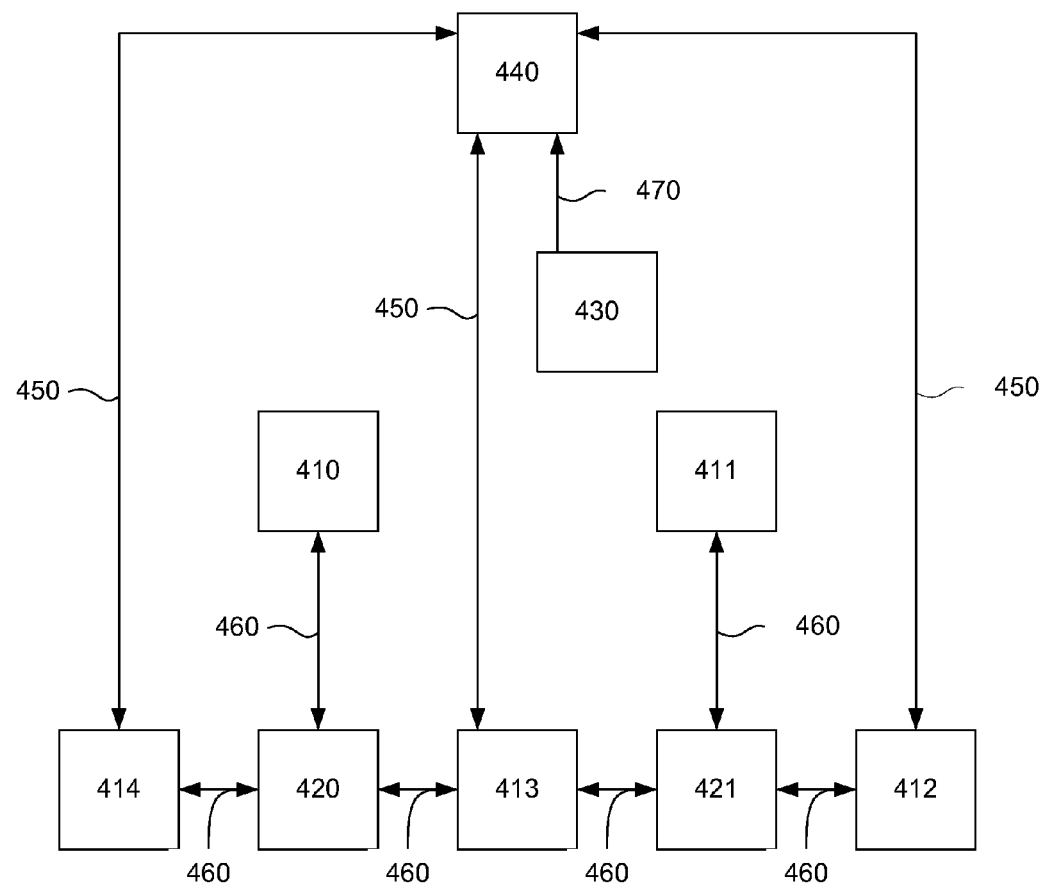

The relationships between the different features are depicted in FIG. 4C. For example, relationships 450 are bidirectional relationships between route feature 440 and road segment features 412-413 or, for example, "road segment-route" type relationships. Relationships 460 are bidirectional relationships between various road segments and an intersection, or "road segment-intersection" type relationships.

FIG. 4D depicts several of the exemplary incremental features and associated feature data. For example, feature 440 is a route with boundaries defined by the geolocation coordinates (5,9)-(15,11). The route feature may be considered a "parent" feature as it includes reference to features which may be considered subparts of the parent feature, such as road segment features 411-13. These road segment features may be considered "children." Thus, in FIG. 4D, route feature 440 includes references to road segment features 411-13. Route feature 440 also includes information identifying the type of its "children," here "road segment." Finally, route 440 also includes a name, "14$^{th}$ Street." Similarly, road segment feature 413 is a section of road with boundaries, a starting point and an end point which span between two intersections, namely, intersections 420-21. Intersection feature 421 also includes boundaries, a point or latitude and longitude pair at which the intersection sits, and references to road segment features 411-13.

Thus, these exemplary incremental features represent three distinct relationship types; "road segment-route," "road segment-intersection," and "establishment-route relationships." In the example, each of these relationships is required to satisfy various rules. For example, for each "road segment-route": (1) the relationship must be bidirectional, (2) the road segment's bound must be contained within the route's bound, (3) the road segment's route type must be equal to the referred to route's type, and (4) the route's child type must be equal to the referred to road segment's type. For each "road segment-intersection": (1) the relationship must be bidirectional, (2) the intersection's bound must be contained by the road segment's bound, (3) the road segment's start-intersection's point must be equal to the road segment's start-point, and (4) the road segment's end-intersection's point must be equal to the road segment's endpoint. As explained above, changes to these features may be examined to determine whether any relationships with referenced features must also be validated.

Editing a route feature which includes bidirectional relationships may trigger validation checks. For example, changing the name of route feature 440 to "Fourteenth Street" may not trigger any validation requirements because there may be no bidirectional relationship type which depends upon a route's name. Increasing the bound of route feature 440 to (4,9)-(15,11) may not trigger any validation requirements because feature 440 does not include any bidirectional relationship types which could be affected by this change. In other words, any feature previously contained within feature 440's bound would still be contained within it and there is no feature in which feature 440 is required to be contained.

Shrinking feature 440's bound to (6,9)-(15,11) may trigger a validation requirement because such a change is likely to affect relationships of the "road segment-route" type. Thus, the server may call features 410-414. In this example, feature 413's bound is no longer within the bound of feature 440. Accordingly, when this pair of features, 440 and 413, are examined by the appropriate set of code based on the "road segment-route" relationship type, this edit would produce an inconsistency and may be rejected as described above.

In another example, removing the reference to feature 413 from feature 440 may trigger a validation check because of the bidirectional "road segment-route" relationship between these features. For example, this edit may affect road segment feature 413 because of its reference to route feature 440. If feature 413 still includes a reference to feature 440, in other words, if a corresponding edit to feature 413 did not also remove the reference to feature 440, the edit to feature 440 may be rejected.

In yet another example, adding a reference to road segment feature 414 in route feature 440 may trigger a validation check because of the bidirectional "road segment-route" relationship between these features. For example, this edit would result in including feature 414 as a child of feature 440. This could produce an inconsistency where the edit may be rejected if feature 414 did not also include a corresponding change to include a reference to feature 440 in the list of routes for feature 414.

In still another example, changing feature 440's child-type to "ferry segment" may trigger a validation requirement with each of feature 440's children because of the bidirectional "road segment-route" relationship between these features. If the type of any child would not be included in the child-type "ferry segment," then the edit may be rejected.

In a further example, changing feature 440's feature type to "highway" may require a validation check comparing feature 440 to its children because of the bidirectional "road segment-route" relationship between these features. If any child has a route-type other than "highway," the edit may be rejected.

In yet a further example, deleting feature 440 may trigger validation checks comparing feature 440 to its children (based upon its state from before the deletion) because of the bidirectional "road segment-route" relationship between these features.

Similar to route features, editing road segment features which include bidirectional relationships may trigger bidirectional validation checks. In one example, changing road segment feature 413's type or route-type may trigger a validation check comparing feature 413 to feature 440 based on the bidirectional "road segment-route" relationship between these features. The server may verify whether the corresponding child-type or feature type of feature 440 are still consistent. If not, the server may reject these edits.

In another example, changing route segment feature 413's end point may trigger a bidirectional validation check comparing feature 413 to intersection feature 421 based on the bidirectional "road segment-route" relationship between these features. The server may verify that feature 413's end point is equal to feature 421's point geometry after the edit (i.e. whether intersection feature 421 has also been edited to reflect this change). If not, the server may reject this edit.

In yet another example, changing route segment feature 413's bound may trigger a bidirectional validation check. For example, based on the bidirectional "road segment-route" relationship type, the server may compare feature 413 to feature 440 if feature 413's bound grows, to feature 421 if feature 413's bound shrank, or to both features 421 and 440 if the bound changed in a way that was neither strictly shrinking nor strictly growing.

In still another example, changing other attributes of road segment feature 413, such as by making it a one-way road, or adding a bend in its path without affecting its endpoints, may not trigger any bidirectional validation checks as no bidirectional relationship types would be affected.

Incremental Features with Uni-Directional Relationships

The server may perform validation checks on an incremental feature which includes a unidirectional relationship with another incremental feature. Unidirectional relationships may be handled similarly to bidirectional relationships when the feature which contains the reference (for example, the first feature) is being modified. The server determines that a first feature includes a unidirectional relationship with a second feature, the server may identify the type of the relationship and an appropriate set of code for examining the feature (e.g. a C++ object). For example, where one feature of a certain type (an establishment) references another feature of a certain type (a road segment) the server may identify the relationship as a "establishment-road segment" relationship. The server may determine that this is a unidirectional relationship as all establishment-road segment relationships may be unidirectional.

Once the relationship has been classified, the server may identify an appropriate set of code, such as a C++ object, for the identified relationship type. If a feature includes multiple unidirectional relationship types with other features, the server may identify one or more C++ objects.

As the relationship between the first feature and the second feature is unidirectional, the server may determine if some action is required with regard to a corresponding backreference. The server may run the appropriate set of code on the feature that is being edited and records the changes to the references included in the feature in order to determine what type of action to take with regard to any backreferences. For example, the server may determine whether a unidirectional reference is being added, kept, or dropped from the examined feature. Once all the objects have been run, the feature being edited and its backreference modifications are consolidated, taking into account all of the contributions from different relationships. For example, a business may include two references to a road segment, one reference being based on a component of business's address and another reference for an access point to the business. If the business feature is edited to remove the access point relationship, server may record would record a "drop" or similar status for the backreference. If the address relationship remains despite the edits to the business feature, that object may record a "keep". Taken together, these two results may cause the backreference to be kept.

These consolidated add, keep or drop decisions may be made based on the type (or unidirectional relationship type) of the backreference. For example, if the backreference includes a position component as well as a directionality component, the position backreference may be kept while the directionality backreference may be removed. In some examples the unidirectional checks can involve some validation checks that involve looking up the second feature. For example, an establishment feature may include a reference to a route. The establishment-route reference may be unidirectional, but if the reference between the establishment and the route is created, the server may need to verify that the establishment is within the bounds of the route. Thus, if the establishment is moved, the server may want to re-verify whether the establishment is still within the bounds of the route.

In order to also run the validation when the referred to feature (for example, the second feature) is being modified, the server may also store backreferences in the repository. For example, a business may refer to a road segment as both a component of its address and as an access point. If the road segment does not also contain reverse references to the business, the server may generate a backreference from the road segment to the business, for example, for the address and the access point relationships when validating these relationships as described above (e.g. conducting an add). As described above, this backreference may be associated with the feature identifier of the referred to feature, in this example, the road segment, and stored in memory. Thus, backreferences may be computed whenever the server is examining the difference between the old and new versions of a feature during a validation check and the server encounters a unidirectional reference.

When an update to an incremental feature is committed to the repository (to be accessed by client devices), all of the modifications to the backreferences may also be committed at the same time. The server may use transactions in the repository (or the consistent storage) in order to maintain consistent views of the independent features.

Whenever an incremental feature is modified, in addition to validating bidirectional relationships as described above, the server may also retrieve any backreferences associated with the feature. For each second feature which is both being edited and also a referred to feature in a unidirectional relationship, the server may not be able to automatically determine if the second feature is a referred to feature based on the attributes of the second feature alone. Rather than calling each of the other features in the repository to determine if the changes to the second feature may affect any other features, the server may query the backreference table for the second features' feature ID. If the feature ID is found, a backreference exists for the second feature, and the server may identify the unidirectional relationship type associated with the backreference. Based on the relationship type, the server may identify an appropriate set of code for examining the second feature. The server may then examine the second feature to determine whether the edit may affect the identified relationship type. The server may identify another feature from the backreference, call the identified feature from the repository, and pass the edited feature and the identified feature through the appropriate set of code in order to validate the relationship between the features. In one alternative, the server may first identify the relationship types which may be affected by an edit to a feature and then determine whether there are any backreferences including the edited feature of those relationship types.

As with bidirectional relationships, editing a route feature that includes a unilateral relationship may trigger checks. Returning to the example of FIGS. 4A-4D, feature 430 includes relationship 470 with feature 440. Relationship 470 is a unidirectional "establishment-route" or "address" relationship type between establishment feature 430 and route feature 440. As with bidirectional relationships, this relationship is also required to satisfy a set of rules. For example, for each address a feature's bound must be contained with the bound each of the features listed in the address. For example, if the address relationship is also an "establishment-route" relationship, the establishment must be within the bound of the route (the route must be included in the address of the establishment).

As establishment feature 430 includes a unidirectional relationship with route feature 440, when the reference to feature 440 was initially included in feature 430, the server should have written a backreference into the backreference table identifying feature 440 as having an address or "establishment-route" relationship with feature 430. Accordingly, when the server searches the backreference table for backreferences identifying route feature 440, the server may identify establishment feature 430. Thus, the server may request feature 430 from the repository to determine whether the changes to route feature 440 would create an inconsistency with the establishment.

Again, if the server identifies changes to the features which would affect this unidirectional relationship type, the server may call the both features from the repository. Returning to the example above, increasing the bound of route feature 440 to (4,9)-(15,11) may not trigger any validation requirements because any feature previously contained within route 440's bound would still be contained within it and there are no feature in which route feature 440 is required to be contained. In other words, this type of change would not affect this type of unidirectional relationship.

In one example, changing the name of route feature 440 to "15$^{th}$ Street" may trigger a validation requirement as this may affect the address or location of an establishment. In another example, changing the route's type, for example from a highway to an ordinary street, may trigger a validation requirement. In other words, these types of changes may affect this type of unidirectional relationship. Similarly, shrinking route feature 440's bound to (6,9)-(15,11) may trigger a validation requirement because such a change is again likely to affect an "establishment-route" relationship because the change may cause the establishment to no longer be within the bounding box of the route.

In another example, deleting feature 440 may trigger validation checks comparing feature 440 to its children (based upon its state from before the deletion) but may also trigger validation checks comparing feature 440 with feature 430 because of the type of unidirectional relationship between these features.

Editing an establishment feature may trigger the server to check the status of any backreference data. For example, moving or growing the bound of establishment feature 430 may trigger a check of the status of any backreferences. This change would require the server to examine the type of edit to feature 430 to determine whether to add, drop or keep a corresponding backreference. In addition, the server may conduct a validation check to ensure that feature 430's bound was still contained within feature 440's bound. If feature 430's bound was no longer contained within feature 440's bound after the transaction, then the edit may be rejected. However, if in addition to moving the bound of establishment feature 430 outside of the bound of feature 440 and the edit to establishment feature 430 also included changing the address reference to route feature 440, this edit may not be rejected.

The exemplary features of FIG. 5 demonstrate a unidirectional "hierarchy" relationship among features representing business establishments which contain one another as well as bidirectional relationships between a feature representing a business and another representing the business's building. For example establishment features 501-03 represent a fictitious doctor, the doctor's medical practice, and the medical practice's building, respectively. The medical practice establishment feature 503 includes a bidirectional relationship with the building establishment feature 502 it occupies. The doctor establishment feature 501 includes a unidirectional relationship with the medical practice establishment feature 501.

In the simplest example, the only requirement for both of these "establishment-establishment" relationships may be the bound. In that case, growing or shrinking any of the bounds of features 501-03 may trigger a validation check, but no other changes would trigger any validation checks in this example.

If there are more complex consistency requirements, other changes may trigger validation checks. For example, a business establishment may be required to list its access points (i.e., where the business is located along a road segment). These access points may be required to be equal to the access points of the building which it occupies. In this example, a change to the access points of features 502 or 503 may trigger a check comparing these features. In another example, doctors and practices may be required to list specialties, in which case, the server may require those specialties to match. Thus a change to the specialty of feature 501 or 502 may trigger a validation check comparing these features.

Figure 6:
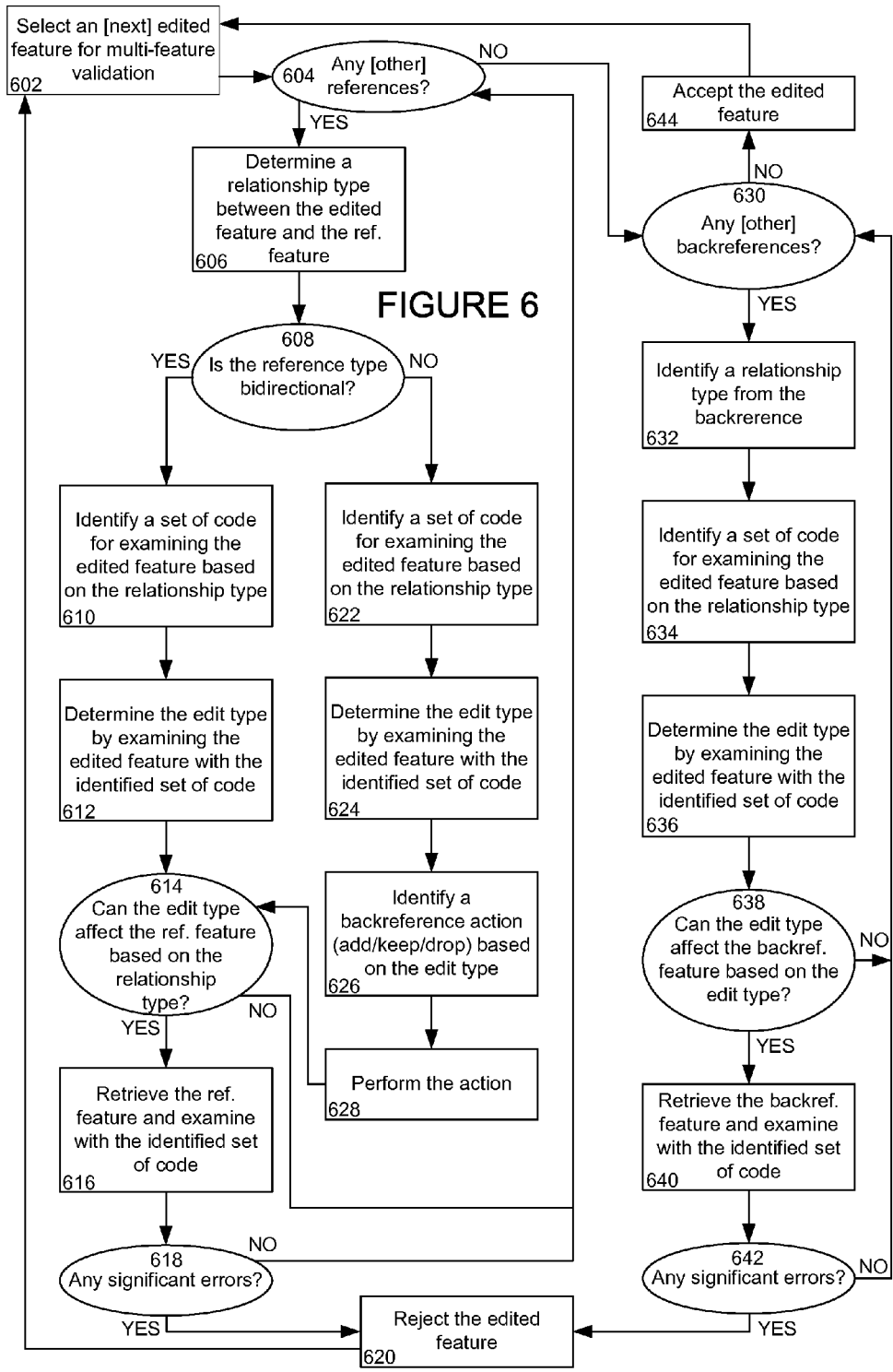
FIG. 6 is a flow diagram in accordance with aspects of the invention.

FIG. 6 depicts exemplary flow diagram 600 based on the processes described above. At block 602, the server selects an edited incremental feature for multi-feature validation. For example, before or after the server has validated the single-feature attributes of a feature, the server may validate any references or backreferences associated with the selected edited feature. At block 604, the server determines whether the edited feature includes any references to other features. If so, the server determines a relationship type of the relationship between the edited feature and the referenced feature at block 606. The server also determines whether the relationship is bidirectional (or unidirectional) at block 608. If the relationship is bidirectional, the server then identifies a set of code for examining the edited feature base on the relationship type at block 610. The server then determines an edit type by examining the edited feature with the identified set of code at block 612. At block 614, the server determines whether the edit type could affect the referenced feature based on the relationship type. If not, the server returns to block 604 to determine whether the edited feature includes any additional references. If the edit type could affect the referenced feature, the server retrieves the referenced feature from the repository and examines the referenced feature with the identified set of code at block 616. The server then determines whether the examination results in significant errors between the edited feature and the referenced feature at block 618. For example, the server may determine whether the edited feature and the referenced feature meet a set of requirements associated with the bidirectional relationship type. If there are no significant errors, the server returns to block 604 to determine whether the edited feature includes additional references. If there are significant errors, the server may reject the edited feature at block 620, and return to block 602 to select the next edited incremental feature for multi-feature validation.

Returning to block 608, if the relationship type is not bidirectional, the server may determine that the relationship type is unidirectional. The server then identifies a set of code for examining the edited feature base on the relationship type at block 622. The server determines an edit type by examining the edited feature with the identified set of code at block 624. Next, the server identifies a backreference action, for example, add, keep, or drop, based on the edit type at block 626. At block 628, the server performs the identified action and returns to block 614 to determine whether the edit type could affect the referenced feature based on the relationship type.

Returning to block 604, if the edited feature does not include any additional features, the server moves to block 630 to determine whether there are any backreferences. For example, the server may query a backreference table for the edited feature's feature ID. If a backreference is identified, the server identifies a relationship type associated with the identified backreference at block 632. The server then identifies a set of code for examining the edited feature base on the relationship type at block 634. The server determines an edit type by examining the edited feature with the identified set of code at block 636. At block 638, the server determines whether the edit type could affect the backreferenced feature based on the relationship type. If not, the server returns to block 630 to determine whether the edited feature includes any additional backreferences.

If the edit type could affect the backreferenced feature, the server retrieves the backreferenced feature from the repository and examines the backreferenced feature with the identified set of code at block 640. The server then determines whether the examination results in significant errors between the edited feature and the backreferenced feature at block 642. For example, the server may determine whether the edited feature and the referenced feature meet a set of requirements associated with the unidirectional relationship type. If there are no significant errors, the server returns to block 630 to determine there are any additional backreferences. If there are significant errors, the server may reject the edited feature at block 620, and return to block 602 to select the next edited incremental feature for multi-feature validation.

Returning to block 630, if there are no additional backreferences, the server then accepts the edited feature at block 644. Next, the server returns to block 602 to select the next edited incremental feature for multi-feature validation.

In another example, the server may iterate over all of the validation check types. Each validation check type may be associated with a reference type which may be affected by an edit to a feature with such a reference. For each reference type associated with a particular validation check, the server may determine whether the reference type is relevant to the feature being edited, whether the edited feature and the reference type share a relationship type (e.g. a "road segment-intersection" relationship type would not be relevant to a business) and whether the feature includes any references of that type. For example, for a particular check the server may determine whether the feature, either before or after the edit, contains any references of the type considered by the check. Next, the server may determine whether the particular edit to the feature could possibly affect the result of the check as applied to any of the feature's references. If so, the server may retrieve the referred to feature and examine it with an appropriate set of code to determine if there any warnings or errors. This may allow the server to retrieve the referred to features simultaneously and validate a plurality of features in parallel. The server may also determine whether the relationship type is unidirectional or bidirectional and if necessary, identify a backreference action.

In addition, the consistency and validation checks described above may also be run by the server in a batch mode. For example, the server may check the consistency of the entire incremental feature repository at one timestamp. This may be needed in order to introduce a new consistency check or after all of the bulk edits have been written for a new epoch and a new set of incremental features which include references to bulk features at the new epoch have been written.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method for validating edits to geographical features, the method comprising:
   storing, by the one or more processors, a plurality of geographical features;
   editing, by the one or more processors, a first feature corresponding to a road segment by making one or more edits to obtain an edited first feature;
   identifying, by the one or more processors, a reference associated with the edited first feature, the reference identifying a second feature of the plurality of geographical features;
   determining, by the one or more processors, a relationship type identifying a physical relationship between the edited first feature and the second feature;
   identifying, by the one or more processors, a set of requirements defining how the edited first feature and the second feature relate to one another in the repository;
   determining, by the one or more processors, whether the edited first feature and the referenced second feature satisfy the set of requirements; and
   when the edited first feature and the referenced feature are determined to satisfy the set of requirements, validating, by the one or more processors, the edited first feature.

2. The method of claim 1, wherein the second feature is a route defined by geographic location coordinates, and the physical relationship between the route and the edited first feature indicates that the route includes a road segment of the edited first feature.

3. The method of claim 2, wherein the set of requirements includes that the second feature and the edited first feature have a bidirectional relationship.

4. The method of claim 2, wherein the set of requirements includes that the edited first feature have a bound that is contained within a bound of the route of the second feature.

5. The method of claim 2, wherein a route type associated with the edited first feature is equal to a route type of the second feature.

6. The method of claim 2, wherein a route type associated with the edited first feature is equal to a route type of the second feature.

7. The method of claim 2, wherein a subpart type of the route is equal to a type of the edited first feature.

8. The method of claim 1, wherein the second feature is an intersection and the physical relationship between the intersection and the edited first feature indicates that the edited first feature is connected to the intersection.

9. The method of claim 8, wherein the set of requirements includes that the second feature and the edited first feature have a bidirectional relationship.

10. The method of claim 1, wherein editing the first feature includes decreasing a length of the road segment.

11. A system for validating edits to geographic features, the system comprising:
  memory storing a plurality of geographical features;
  one or more processors configured to:
    edit a first feature corresponding to a road segment by making one or more edits to obtain an edited first feature;
    identify a reference associated with the edited first feature, the reference identifying a second feature of the plurality of geographical features;
    determine a relationship type identifying a physical relationship between the edited first feature and the second feature;
    identify a set of requirements defining how the edited first feature and the second feature relate to one another in the repository;
    determine whether the edited first feature and the referenced second feature satisfy the set of requirements; and
    when the edited first feature and the referenced feature are determined to satisfy the set of requirements, validate the edited first feature.

12. The system of claim 11, wherein the second feature is a route defined by geographic location coordinates, and the physical relationship between the route and the edited first feature indicates that the route includes a road segment of the edited first feature.

13. The system of claim 12, wherein the set of requirements includes that the second feature and the edited first feature have a bidirectional relationship.

14. The system of claim 12, wherein the set of requirements includes that the edited first feature have a bound that is contained within a bound of the route of the second feature.

15. The system of claim 12, wherein a route type associated with the edited first feature is equal to a route type of the second feature.

16. The system of claim 12, wherein a route type associated with the edited first feature is equal to a route type of the second feature.

17. The method of claim 12, wherein a subpart type of the route is equal to a type of the edited first feature.

18. The system of claim 11, wherein the second feature is an intersection and the physical relationship between the intersection and the edited first feature indicates that the edited first feature is connected to the intersection.

19. The system of claim 18, wherein the set of requirements includes that the second feature and the edited first feature have a bidirectional relationship.

20. A non-transitory computer-readable medium on which instructions are stored, the instructions when executed by one or more processors, cause the one or more processors to perform a method of validating edits to geographical features, the method comprising:
  editing a first feature corresponding to a road segment by making one or more edits to obtain an edited first feature;
  identifying a reference associated with the edited first feature, the reference identifying a second feature of the plurality of geographical features;
  determining a relationship type identifying a physical relationship between the edited first feature and the second feature;
  identifying a set of requirements defining how the edited first feature and the second feature relate to one another in the repository;
  determining whether the edited first feature and the referenced second feature satisfy the set of requirements; and
  when the edited first feature and the referenced feature are determined to satisfy the set of requirements, validating the edited first feature.

* * * * *